United States Patent
Husain et al.

(10) Patent No.: US 6,814,861 B2
(45) Date of Patent: Nov. 9, 2004

(54) ULTRAFILTRATION AND MICROFILTRATION MODULE AND SYSTEM

(75) Inventors: Hidayat Husain, Brampton (CA); Andreas Draesner, Oakville (CA); Michael Blair, Oakville (CA); Henry Behmann, Puslinch (CA)

(73) Assignee: Zenon Environmental, Inc., Oakville (CA)

( * ) Notice: Subject to any disclaimer, the term of this patent is extended or adjusted under 35 U.S.C. 154(b) by 164 days.

(21) Appl. No.: 10/286,930

(22) Filed: Nov. 4, 2002

(65) Prior Publication Data

US 2003/0057155 A1 Mar. 27, 2003

Related U.S. Application Data

(62) Division of application No. 09/648,854, filed on Aug. 25, 2000, now Pat. No. 6,589,426.
(60) Provisional application No. 60/213,450, filed on Jun. 22, 2000, and provisional application No. 60/156,664, filed on Sep. 29, 1999.

(51) Int. Cl.⁷ ................................................ B02F 9/00
(52) U.S. Cl. .................... 210/257.2; 210/650; 210/636; 210/333.01; 210/321.8; 210/136
(58) Field of Search ............................. 219/257.2, 650, 219/636, 195.1, 333.01, 136, 321.8

(56) References Cited

U.S. PATENT DOCUMENTS

| | | | |
|---|---|---|---|
| 3,716,141 A | 2/1973 | Spatz | 210/194 |
| 3,786,924 A | 1/1974 | Huffman | 210/257 |
| 3,992,301 A | 11/1976 | Shippey et al. | 210/23 |
| 4,414,113 A | 11/1983 | LaTerra | 210/636 |
| 4,876,006 A | 10/1989 | Ohkubo et al. | 210/321.69 |
| 4,921,610 A | 5/1990 | Ford et al. | 210/636 |
| 5,053,128 A | 10/1991 | Spranger | 210/232 |
| 5,160,042 A | 11/1992 | Bikson et al. | 210/321.8 |
| 5,209,852 A | 5/1993 | Sunaoka et al. | 210/636 |
| 5,248,424 A | 9/1993 | Cote et al. | 210/636 |
| 5,282,964 A | 2/1994 | Young et al. | 210/321.8 |
| 5,437,788 A | 8/1995 | Geibel et al. | 210/333.01 |
| 5,456,842 A | 10/1995 | Kibblehouse et al. | 210/649 |
| 5,607,593 A | 3/1997 | Cote et al. | 210/650 |
| 5,643,455 A | 7/1997 | Kopp et al. | 210/636 |
| 5,647,988 A | 7/1997 | Kawanishi et al. | 210/636 |
| 5,762,789 A | 6/1998 | de los Reyes et al. | 210/321.75 |
| 5,783,083 A | 7/1998 | Henshaw et al. | 210/636 |
| 5,958,243 A | 9/1999 | Lawrence et al. | 210/636 |
| 6,027,649 A | 2/2000 | Benedek et al. | 210/639 |
| 6,120,688 A | * 9/2000 | Daly et al. | 210/650 |
| 6,193,890 B1 | 2/2001 | Petersen et al. | 210/636 |
| 6,214,231 B1 | 4/2001 | Cote et al. | 210/636 |
| 6,303,035 B1 | 10/2001 | Cote et al. | 210/636 |
| 6,589,426 B1 | * 7/2003 | Husain et al. | 210/650 |

FOREIGN PATENT DOCUMENTS

| | | | | |
|---|---|---|---|---|
| EP | 0481391 | 4/1992 | | B01D/29/66 |
| EP | 0669159 | 8/1995 | | B01D/65/02 |
| JP | 4007081 | 1/1992 | | C02F/1/44 |
| JP | 4180887 | 6/1992 | | C02F/1/44 |
| JP | 7178323 | 7/1995 | | B01D/65/02 |
| JP | 10323544 | 12/1998 | | B01D/65/02 |

* cited by examiner

*Primary Examiner*—Ana Fortuna
(74) *Attorney, Agent, or Firm*—Andrew Alexander

(57) ABSTRACT

A method and apparatus of purifying feedwater to remove impurities including suspended solids therefrom, the method suitable for using in-line water pressure to permeate water through hollow fiber membranes and to backflush the membranes to remove solids collected or deposited thereon.

10 Claims, 8 Drawing Sheets

ULTRAFILTRATION AND MICROFILTRATION MODULE AND SYSTEM

CROSS REFERENCE TO RELATED APPLICATION

This application is a division of U.S. Ser. No. 09/648,854, field Aug. 25, 2000 now U.S. Pat. No. 6,589,426, which claims the benefit of U.S. Provisional Application No. 60/156,664, filed Sep. 29, 1999, and 60/213,450, filed Jun. 22, 2000, incorporated herein by reference.

BACKGROUND OF THE INVENTION

This invention relates to water purification and more particularly it relates to a membrane water filtration system for in-home application, for example, to provide a reliable supply of safe water with only minimum maintenance.

Recent outbreaks of diseases caused by the presence of parasite cysts such as cryptosporidium and Giardia Lambia in municipal water supplies have created a great need for systems that provide potable water without fear of disease. Most municipalities rely on destruction of these pathogens with chlorine which is only partially effective. Some water purification systems use ultraviolet light disinfection but as with chlorine, this technology also is only partially effective in destroying pathogens present in water, especially the parasite cysts mentioned above.

Membrane-based technology has been used for purifying water. However, the use of conventional membranes is subject to fouling and requires frequent chemical cleaning which is not considered safe for residential or commercial use. Small disposable cartridges are sold for point-of-use applications, e.g., kitchen sink tap, but are very high cost and do not provide whole-house protection against impurities.

To improve the flow of permeate through membranes to provide purified water, different techniques have been employed. For example, U.S. Pat. No. 4,921,610 discloses removal of solids from membranes by a series of chemical cleaning cycles. The optimum time and pattern of the cleaning cycles are calculated from the rate of diminution in filtrate flow rate and the time and filtrate lost in each cycle. This is achieved by calculating from the rate of diminution of the filtrate flow rate after each application of a pressurised liquid and/or gaseous backwash cleaning cycle an equation expressing the relationship between filtrate flow and time, and, allowing for the time lost in each backwash cycle and the amount of filtrate lost in each backwash cycle, and, calculating from filtrate loss, the time loss and the relationship between filtrate flow rate and time, the optimum time of application of liquid and/or gaseous backwashes.

Japanese Patent 4-180887 discloses passing water through a hollow yarn membrane from the inside to the outside and washing the inner surface of the membrane with filtered water except during treatment times. Raw water is introduced through a top port and is filtered before being introduced to the hollow membrane and passing out a bottom port. A resin fixed bed and activated carbon are also used.

U.S. Pat. No. 4,414,113 discloses a method and apparatus for removing dissolved solids from a liquid which utilizes the technique of reverse osmosis (RO). The liquid to be treated is directed into a pressure vessel which contains a plurality of filter elements positioned therein. The filter elements have hollow RO fibers wound around foraminous center cores such that the liquid flows in a direction from the outside of the filter elements towards the center cores. The pure permeate liquid passes into the center bores of the fibers and the concentrate liquid passes into the center cores of the elements.

The method and apparatus provide for the backwashing of the filter elements when they become fouled. Further, an outer filter septum may be applied around the hollow RO fibers of the elements to remove particulate matter which would otherwise foul the hollow RO fibers.

U.S. Pat. No. 3,786,924 discloses a water purification system incorporating a reverse osmosis unit for purifying water. The system yields two streams, one of very high purity for drinking and cooking and the like and one of lower quality for use in toilet tanks, lawn watering, garden irrigation and the like. The system provides apparatus and techniques for reconciling the varying flow rates inherent in a domestic water system with the constant flow rate desirable for efficient performance of the reverse osmosis unit. Provision is made for automatic flushing and backwashing of the reverse osmosis element.

U.S. Pat. No. 3,716,141 discloses a solvent-separating apparatus for purifying water by exposing the water, under pressure, to a solvent-separating means including a non-positive displacement pump for elevating the pressure of the water prior to direction into the water-separating means and means including two presized orifices for maintaining the desired pressure and desired flow rate of the water through the water-separating means and for flushing the water-separating means periodically without the necessity of further adjustments in order to return the system to normal operating conditions.

U.S. Pat. No. 3,992,301 discloses an automatic flushing and cleaning system for membrane separation machines such as reverse osmosis machines having plural modules or membranes. Cleaning may be by way of reducing the pressure to allow the membrane to relax, by the injection of air or inert gas to provide turbulence, and/or by injection of flushing liquid which may include chemical cleaning additives. Pumps, automatic valving, and pressure controls are provided, along with a complete time operated electrical sequencing system whereby desired purging, flushing and cleaning cycles are automatically undertaken at periodic intervals or in response to one or more preferred conditions.

U.S. Pat. No. 4,876,000 discloses a hollow fiber filter device having a filter casing which is partitioned by a horizontal member into a filtered liquid chamber and a filtering chamber and a plurality of filter modules are suspended downwardly from the horizontal member. Each of the modules includes a plurality of hollow fibers having upper ends open to the filtered liquid chamber and also having lower ends open to a liquid-collecting chamber which is sealed from the filtering chamber and is arranged to communicate with the filtered liquid chamber by way of a conduit so that the full length of the fiber is utilized for filtration.

U.S. Pat. No. 5,437,788 discloses a filter assembly which includes a housing divided into a first chamber and a second chamber. A filter element is disposed in the first chamber, and a conduit is disposed in and opens to the second chamber. A weep hole introduces a backwash liquid from the second chamber into the filter element or the conduit. A differential pressure is then established between the opening in the conduit and the exterior of the filter element to force the backwash liquid through the filter element and thereby clean the filter element and/or strip a precoat layer from the filter element.

U.S. Pat. No. 5,053,128 discloses a method of manufacturing a diffusion and/or filtration apparatus, including a housing consisting of a cylindrical open-ended main part closed by two end caps and being provided with an inlet and outlet for a first fluid and at least one outlet for a second fluid, said first fluid being adapted to flow through the fibers of a bundle of semi-permeable hollow fibers arranged between two end walls within the housing and said second fluid being adapted to be removed from the space outside the fibers through said at least one outlet for the second fluid.

U.S. Pat. No. 5,059,374 discloses a process for sealing a hollow fiber membrane separation module into a case.

U.S. Pat. No. 5,160,042 discloses an annular double ended hollow fiber bundle, a fluid separation apparatus comprising the annular double ended hollow fiber bundle having bores open at both ends of the hollow fibers embedded in the two tube-sheets enclosed in a shell having multiple ports, a fluid entrance port, a non-permeate exit port and at least one permeate exit port, wherein said double ended hollow fiber bundle is encased in an essentially impermeable film barrier except for entrance regions situated in selected areas between the tubesheets and to processes for separating fluids mixtures.

In spite of these disclosures, there is still a great need for membrane-based filtration system suitable for in-home, commercial and institutional applications. That is, there is great need for a membrane filtration system that will provide reliable, safe service for the house or institution for substantial periods of time without cleaning, in a cost-effective manner.

SUMMARY OF THE INVENTION

It is an object of this invention to provide a membrane-based filtration system suitable for in-home use.

It is another object of this invention to provide a hollow fiber membrane-based filtration system suitable for removing parasite cysts such as cryptosporidium and Giardia Lambia bacteria such as *E-coli* and viruses from municipal waters to provide safe drinking water.

Yet, it is another object of the invention to provide an improved method for purifying municipal water for drinking purposes employing membrane-based filtration wherein cleaning of the membrane is facilitated to improve flux.

And still, it is another object of the invention to provide an improved method for purifying municipal water of cysts, for example, using microfiltration or ultrafiltration hollow fiber membranes to provide for improved recovery.

And still further, it is an object of this invention to provide an improved method for purifying municipal water using microfiltration or ultrafiltration hollow fiber membranes to provide safe drinking water for entire households in a cost-effective manner for substantial periods of time without cleaning the membranes.

These and other objects will become apparent from a reading of the specification, claims and drawings appended hereto.

In accordance with these objects, there is provided a method of purifying feedwater to remove impurities including suspended solids therefrom, the method suitable for using water in-line pressure to permeate water through membranes and to backflush the membranes to remove solids collected or deposited thereon. The method comprises providing a chamber defined by a wall having an inside and having a first end and a second end. Membranes such as hollow fiber membranes selected from ultrafiltration and microfiltration membranes extend between the first end or region and the second end or region. A feedwater entrance is adapted for connection to a water line to introduce feedwater to the chamber at in-line pressure. A permeate water exit is provided for directing purified water throughout the building. In the method, feedwater is introduced through the entrance to the chamber or module to the outside membranes such as hollow fiber membranes. The feedwater is filtered in the chamber by using the in-line pressure to pass water through the hollow fiber membranes to provide permeate water inside the hollow fiber membranes and to concentrate suspended solids outside or on the shell side of the hollow fiber membranes to provide concentrate water. The permeate water flows down the lumens of the hollow fiber membranes and is collected in a permeate collector and dispensed for use. A portion of the permeate water is directed to a diaphragm tank which collects permeate water under water line pressure, the diaphragm tank in liquid connection with the permeate collector. Periodically, the chamber or module is flushed with feedwater and simultaneously therewith the hollow fiber membranes are backflushed with permeate water from the diaphragm tank to remove solids from the membranes while continuing to pass feedwater through the chamber to flush the concentrate water containing solids from the chamber to a drain.

A system is provided for purifying feedwater to remove impurities including solids therefrom, the system adapted to use in-line water pressure to permeate water through membranes and to remove solids collected thereon. The system comprises a chamber having a first end and a second end, a feedwater entrance in said chamber for connecting to a feedwater line and, a permeate water exit and a concentrate water exit. The chamber contains membranes such as hollow fiber membranes selected from ultrafiltration and microfiltration membranes provided in said chamber and disposed between the first end and the second end, the hollow fiber membranes in fluid communication with said permeate water exit and adapted for permeating water from said chamber therethrough into lumens thereof to purify water and reject solids under in-line water pressure to provide concentrate water in said chamber. A permeate water collector is provided for removal of permeate water from said lumens for re-distribution. A diaphragm tank is provided in liquid communication with said permeate water collector for storing permeate water at in-line water pressure for backwashing the membranes with permeate water. Valve means is used for periodically removing concentrate water from said chamber through the concentrate water exit and for lowering the pressure in the chamber below in-line water pressure, said valve means by removing concentrate water and lowering the pressure in said chamber (i) activating backwashing of said membranes with permeate water from said diaphragm tank to dislodge solids from said membranes for removal with said concentrate water during said draining, and (ii) activating flushing of said chamber with feedwater during said periodic flushing and backwashing. The system may be manually drained by opening the drain valve or the system may be manually drained and backwashed by closing the water inlet valve and opening the drain valve.

DETAILED DESCRIPTION OF THE PREFERRED EMBODIMENTS

This invention provides a system for in-home purification of water to remove micro-organisms and particulate matter, including solid matter. Other impurities which can be removed include some heavy metals as well as iron, sulfur, and manganese. The system is designed to operate on municipal in-line pressure or water line pressure without the use of additional pumps. Further, because the system uses membrane-based technology, it is designed to provide back-flushing using in-line water pressure.

Figure 1:
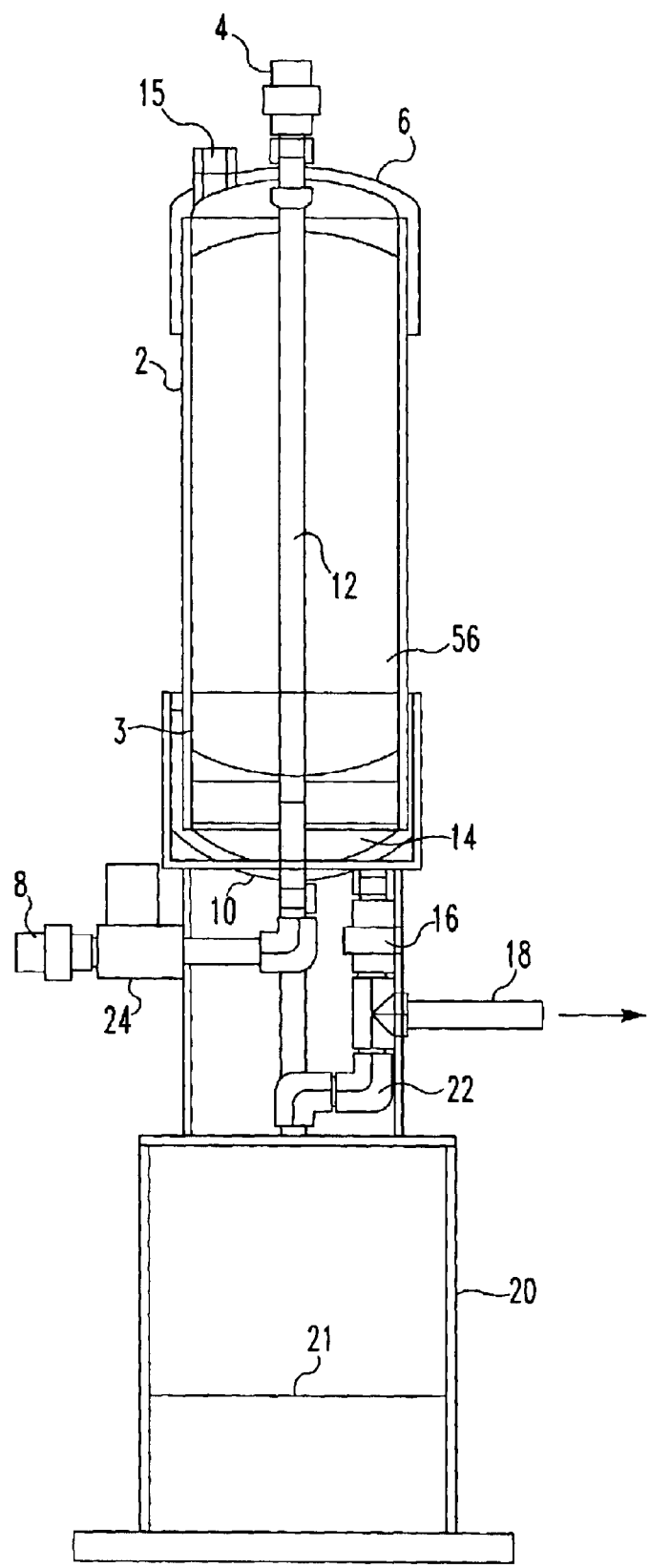
FIG. 1 is a cross-sectional view of a membrane-based system for purifying water showing a filtration tank and backflush tank in accordance with the invention.

One embodiment of the invention is shown in FIG. 1. In the embodiment in FIG. 1, there is shown a tank or chamber 2 having feedwater inlet 4 mounted in top 6. Also, there is shown a pipe 8 extending from bottom 10 for removing water used for flushing. Chamber 2 contains a perforated conduit 12 for carrying flush water and concentrate to drain 8. However, concentrate or flush water may be removed using a drain on the perimeter wall 3 of tank 2. Chamber 2 contains membranes (not shown in FIG. 1) including ultra-filtration membranes or microfiltration membranes which permeate feedwater under in-line water pressure to provide permeate water which may be collected in permeate collections tank or manifold 14. The membranes may be selected from flat sheet membranes, tubular membranes or hollow fiber membranes which can be backwashed. Permeate water recovered from the membranes or from permeate collection tank 14 is directed along line 16 for distribution through buildings such as homes, schools, office buildings, etc. from line 18 to provide a system capable of purifying water on an on-demand basis.

For purposes of backflushing, a portion of the permeate water is directed to diaphragm tank 20 along line 22 which is in liquid communication with filtration tank 2 through permeate tank or manifold 14. A volume of permeate water is stored in diaphragm tank 20 under pressure by diaphragm 21 using in-line water pressure. For flushing and activating diaphragm tank 20, a drain solenoid 24 is provided. That is, for purposes of cleaning the outside surface of the hollow fiber membranes, periodically drain solenoid 24 opens passing concentrate water to the drain through pipe 8, simultaneously therewith because of the reduction in pressure in chamber 2, diaphragm tank 20 discharges permeate water into the hollow fiber membranes and back through the membrane wall forcing solids or entrained debris out of the pores. At the same time, the feedwater flushes the outside or shell side of the fiber membranes carrying dislodged solids and entrained debris to the drain. When drain solenoid 24 is closed, the pressure builds up in chamber 2 to in-line pressure and feedwater once again permeates the fiber membranes. Flow of permeate water is returned to the building. At the same time, diaphragm tank 20 is filled with permeate water up to in-line pressure for the next flushing cycle. Tank 2 may be flushed several times and therefore several backflushes may be utilized consecutively to improve flow rate through membranes, depending on the quality of the water being purified. By use of diaphragm tank as used herein is meant to include any tank that has means for holding pressure for purposes of backwashing such as, for example, a tank employing trapped air referred to herein as a pressure tank.

Figure 2:
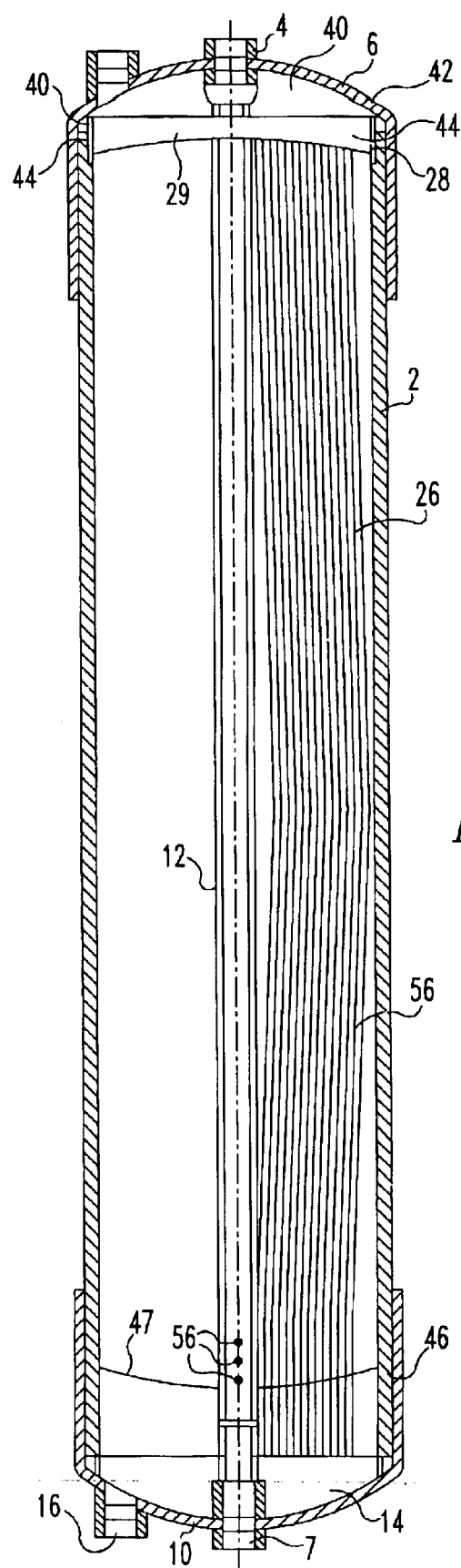
FIG. 2 is a cross-sectional view of a hollow fiber membrane module and water flow therethrough for purifying water in accordance with the invention.

Referring now to FIG. 2, there is shown a preferred embodiment of vessel or chamber 2 where like numbers refer to like components as in FIG. 1. That is, feedwater such as municipal water at line pressure is introduced through top or cap 6 at inlet 4 which is coupled to the municipal water line. Cap 6 may be threaded, glued or welded onto vessel 2 to provide a leak-proof fitting. In the embodiment shown in FIG. 2, hollow fiber membranes 26 are shown located substantially vertically having ends 28 dead end potted in header or first region 29 in the upper portion of chamber 2. In one embodiment, hollow fiber membranes 26 may be provided in chamber 2 in bundles. Bundles 30 of hollow fiber membranes 26 are arranged or are dead end potted in bundles in header 29.

Figure 3A:
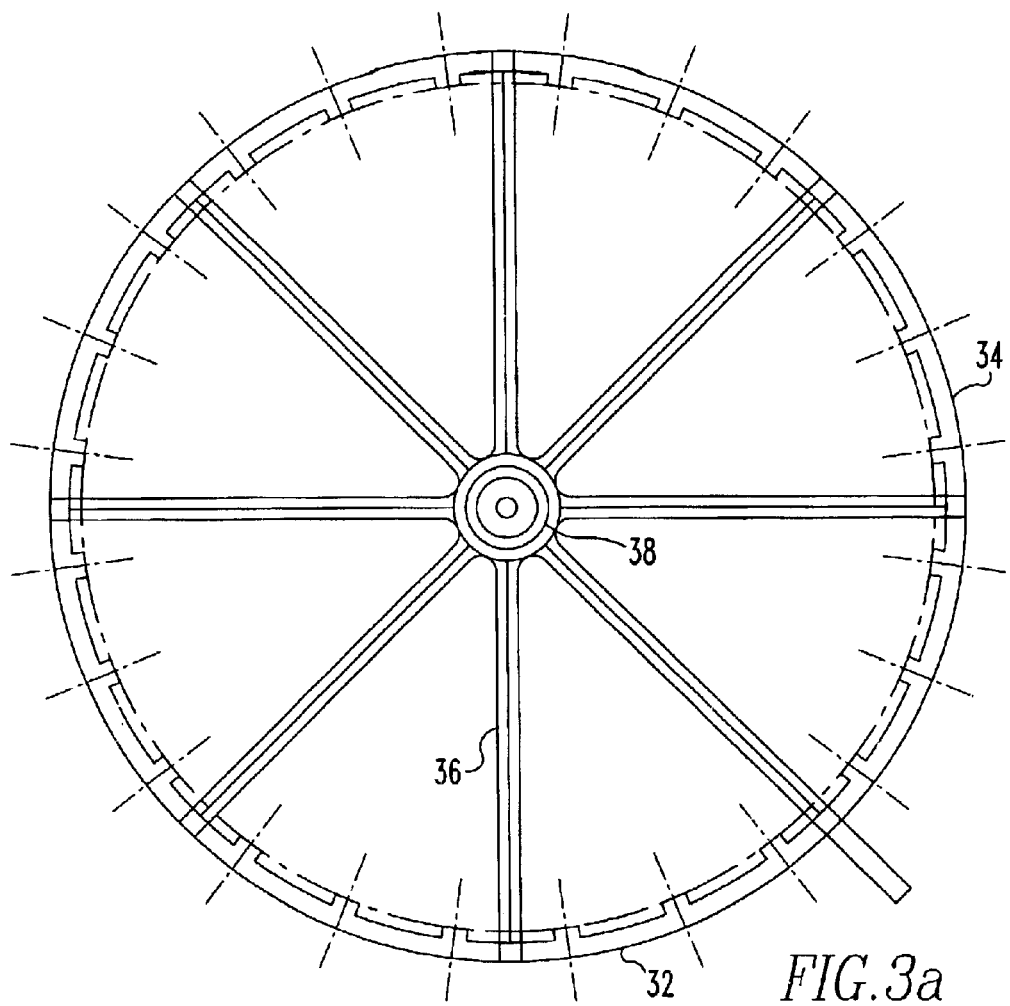
FIGS. 3a and b is a top view of hollow fiber membranes and spider arrangement for positioning fibers in chamber 2.
Figure 3B:
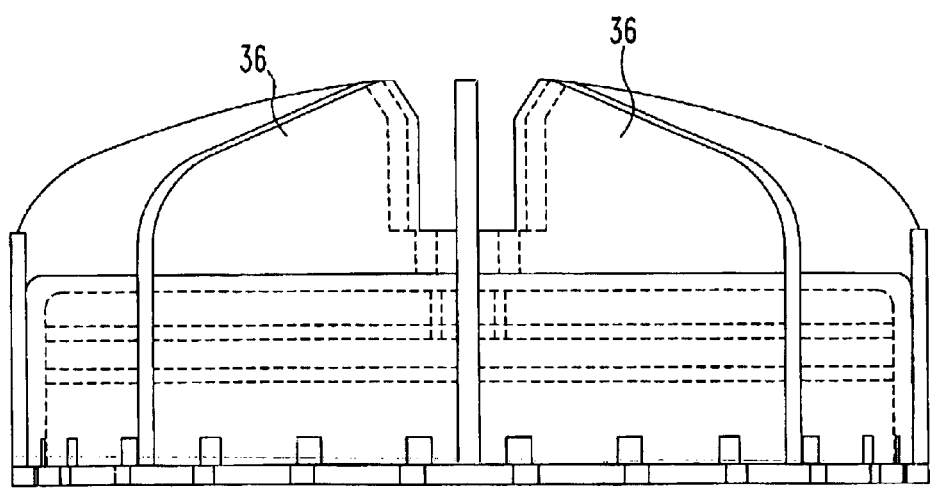

A spider-like arrangement as shown in FIG. 3a and FIG. 3b may be used in chamber 2 for support purposes of cap 6 and for feedwater distribution around perimeter 34. In one embodiment (see FIG. 2), feedwater may be dispersed into cavity 40 between header 29 and cap 6 and dispersed to periphery 42 thereof where it is directed through wall channels 44 into chamber 2, adjacent the wall thereof to provide a generally radially inward flow towards conduit 12.

Figure 4:
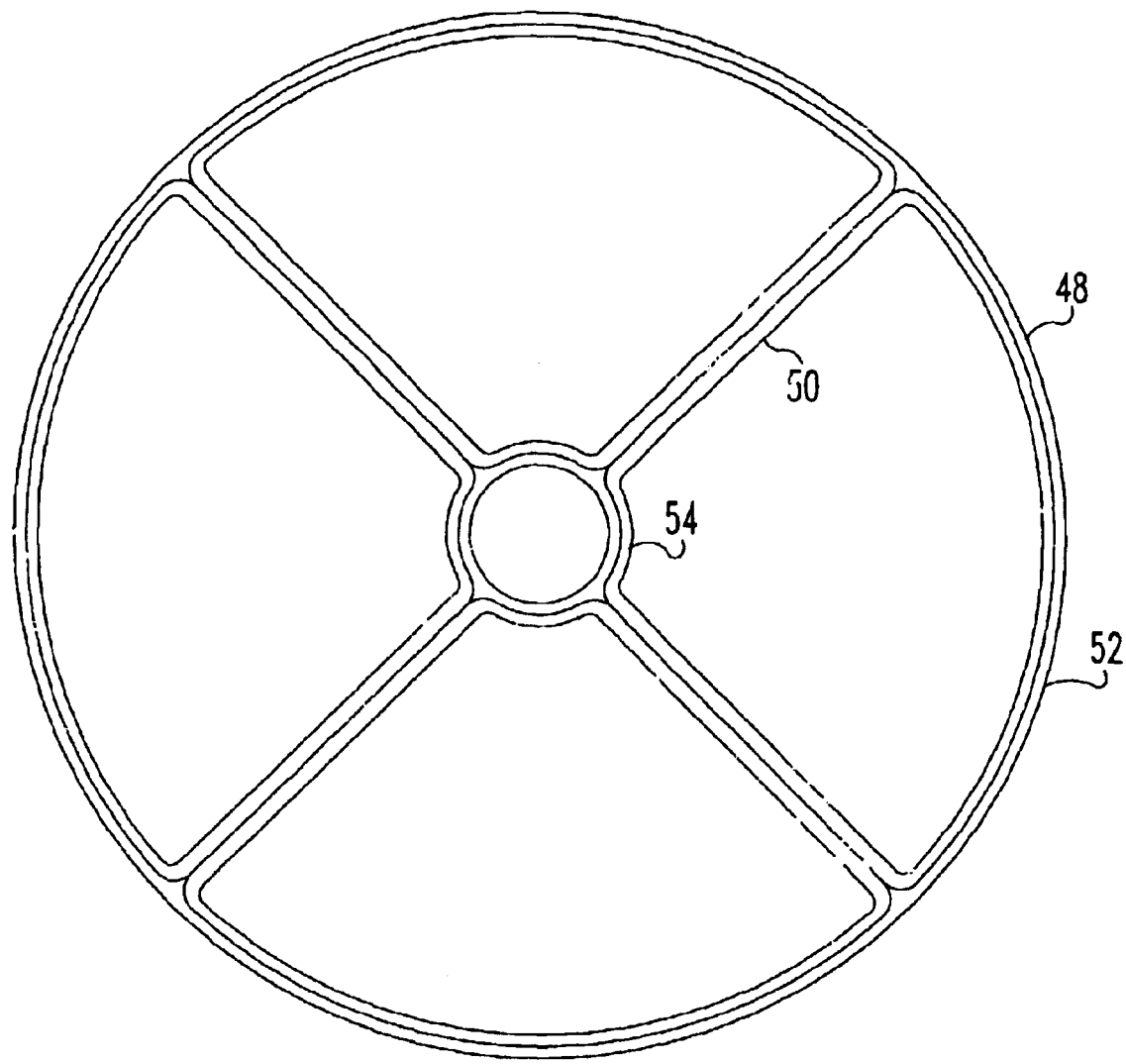
FIG. 4 is a view of a bottom spider arrangement in chamber 2.

A second spider arrangement 48 (see FIG. 4) may be used at bottom portion or second region 46 of vessel 2. Second spider 48 has radially extending arms 50 which extend to perimeter or rim 52 from a central hub 54. Hollow fiber membranes 26 are potted in header 47 to permit drainage of permeate water filtered into the centers or lumens thereof to collect in permeate water collection tank or manifold 14. Second spider 48 at perimeter 52 is sealed against inside wall of vessel 2 to prevent leakage of feedwater or concentrate water into permeate collection tank 14 and contamination thereof. In addition, conduit 12 is sealed against hub 54 of spider 48 to prevent leakage of feedwater or concentrate water.

As shown in FIG. 2, conduit or member 12 extends from bottom cap 10 through the center of vessel 2 to top spider 32. In conduit 12, holes or orifices 56 are provided for purposes of draining feedwater or concentrate water from chamber 2 during flushing. While holes 56 are shown in the lower portion of conduit 12, the holes can extend upwards as far as desired. Thus, when it is required to drain chamber 2, feedwater and concentrate water are flushed around the hollow fiber membranes into conduit 12 through holes 56 and into the drain pipe 8 (FIG. 1). It will be appreciated that conduit 12 is sealed against bottom end 10 at wall 7 to prevent leakage into permeate water tank or manifold 14.

Vessel 2 and top and bottom caps 6 and 10 can be fabricated from metal or plastic because only low pressures, e.g., in-line water pressure, is used in chamber 2.

For purposes of obtaining flow rates of 0.5 to 10 gallons/minute of permeate at peak flow rate at a pressure drop of about 15 psi (in-line pressure), there is required 200 to 1000 $ft^2$ of membrane surface area. Thus, sufficient bundles of hollow fiber membranes at a required length should be used to provide such flow rates. As an example, FIG. 3a shows eight bundles of hollow fiber membranes. Chamber 2 is provided with bundles of fibers which occupy 30 to 50 vol. % of chamber 2.

For purposes of providing potable water, it is preferred to use hollow fiber membranes having a pore size smaller than 1 $\mu$m and more preferably less than 0.5 $\mu$m, with a typical pore size for the membrane being in the range of 0.001 to 1 $\mu$m.

The hollow fiber membranes extend substantially vertically from header 47 to header 29, respectively. It will be understood that chamber 2 may be provided in the horizontal position with the hollow fiber membranes extending in the horizontal from header 47 to header 29. Further, the filtration tank may be located on the bottom and diaphragm tank located on the top with inlet for feedwater being located on the side of tank 2, for example. Thus, the membrane module is comprised of a multiplicity of hollow fibers, through which the flux reaches a constant relatively high value. The terminal end portions of fibers in each header are substantially free from fiber-to-fiber contact. Fibers can operate with a trans-membrane pressure differential in the range of about 0.1 psi to about 25 psi, with the preferred hollow fibers having a trans-membrane pressure differential in the range of about 0.2 to 20 psi. In-line pressure, e.g., 20 to 100 psi is sufficient to overcome the preferred trans-membrane pressure.

Preferred hollow fibers are made of organic polymers and ceramics whether isotropic, or anisotropic, with a thin layer or skin on the outside surface of the fibers. Some fibers may be made from braided polymer covered with a porous natural rubber latex or a water-insoluble cellulosic polymeric material. Preferred organic polymers for fibers are polysulfones, poly(styrenes), PVDF (polyvinylidene fluoride) and PAN (polyacrylonitrile) including styrene-containing copolymers such as acrylonitrile-styrene, butadiene-styrene and styrene-vinylbenzylhalide copolymers, polycarbonates, cellulosic polymers, polypropylene, poly(vinyl chloride), poly(ethylene terephthalate), and the like disclosed in U.S. Pat. No. 4,230,463 the disclosure of which is incorporated by reference thereto as if fully set forth herein.

For hollow fiber membranes, the outside diameter of a fiber is at least 20 $\mu$m and may be as large as about 3 mm, typically being in the range from about 0.3 mm to 2 mm. The larger the outside diameter the lower the ratio of surface area per unit volume of fiber. The wall thickness of a fiber is at least 5 $\mu$m and may be as much as 1.2 mm, typically being in the range from about 15% to about 60% of the outside diameter of the fiber, most preferably from 0.2 mm to 1.2 mm. Typically, burst pressure and compression pressure of the hollow fibers are greater than 100 psi.

The average pore cross-sectional diameter in a fiber may vary widely, being in the range from about 10 to 10,000 Å. The preferred pore diameter for ultrafiltration is in the range from about 10 to 1,000 Å; and for microfiltration, in the range from 1,000 to 10,000 Å. While reference is made to hollow fiber membranes, any membrane, including microfiltration membranes, may be used that provides purified water under in-line water pressure and permits cleaning on a periodic basis for extended membrane life.

For purposes of the invention, the in-line water pressure can range from 15 to 100 psi for purposes of permeating water through the hollow fiber membranes to provide purified water. Further, at these pressures, the system is capable of producing 0.1–10 gpm and typically 7 gpm peak flow rate of permeate water.

In order that the membrane system achieve these flow rates, it is important that vessel 2 be de-concentrated of colloidal matter impurities and suspended solids. By the term "concentrate" as used herein is meant the feedwater contained in vessel 2 which has not passed through hollow fiber membranes 26 and is collected on the outside or shell side along with solids or other matter that are rejected by the membrane. It will be appreciated that the liquid in the shell side of vessel 2 becomes more concentrated in solids and impurities with time of operation. Thus, to maintain high flow rates at low pressures, it is important to de-concentrate or remove rejected matter from chamber 2 periodically, depending to some extent on the quality of the water to avoid excessive build-up of solids and suspended matter on the membrane surface and the attendant decline in flux. In accordance with the invention, chamber 2 is periodically flushed with feedwater by opening drain pipe 8 using drain solenoid 24 (FIG. 1) which permits free flow of feedwater into and out of chamber 2 thereby providing a flushing action of feedwater around hollow fiber membranes 26. The feedwater exits chamber 2 through perforated pipe 12, thereby de-concentrating the buildup of solids in chamber 2. It will be appreciated that opening drain 8 to feedwater flush chamber 2 has the effect of reducing the pressure in chamber 2 below in-line water pressure to approximately atmospheric pressure. Thus, flow of permeate water into hollow fiber membranes lumens is stopped when the pressure in chamber 2 is reduced. Concurrently, with reducing the pressure in chamber 2 and flushing feedwater to drain 8, permeate water stored at line pressure in diaphragm tank 2 flows back into the hollow fiber membranes and dislodges solids or particulate material captured on the outside surface of the membranes. Thus, feedwater flushing combined with backwashing with permeate water operates to clean the hollow fiber membranes and to de-concentrate or purge vessel 2.

It will be noted that an important factor is the amount of time required for de-concentrating or purging vessel 2, particularly when the system is used for treating water for in-home or office buildings, where it is important that there be minimal interruption of the water supply. Thus, supplying feedwater at top 6 and withdrawing permeate water and concentrate water at bottom 10 is a useful feature of the system. That is, it has been discovered that mounting chamber 2 and membranes 26 substantially vertically results in the solids collecting in lower portion 56 of container 2. This is important for flushing purposes because the solids concentrated in lower portion 56 are removed first during flushing with feedwater. Thus, flushing is expedited and the duration of flushing and de-concentrating is minimized. In accordance with the invention, flushing with feedwater can be accomplished with 0.5 volumes to 3 module volumes of feedwater, with a preferred amount being 0.5 to 1 module volume of feedwater. In another aspect of the invention, feedwater may be introduced at the bottom or sides of tank 2 and the drain water can be removed at the top or sides but this is a less preferred embodiment.

Further, for purposes of backflushing with permeate water stored in diaphragm tank 20, backflushing can be achieved with about 0.25 to 0.75 volumes of chamber 2 of permeate water from diaphragm tank 20. Although the diaphragm tank 20 is sized to provide sufficient backwash volume, it can also be sufficiently sized to provide additional permeate water for in-home use for the short duration of flushing of chamber 2. That is, as well as providing water for backflushing hollow fiber membranes 26, diaphragm tank 20 can provide water under pressure for in-home use during backflushing. When using well water supply systems, a diaphragm tank may already be present, and may be incorporated with the filtration system to provide backflushing.

The volume of feedwater required for flushing can vary, depending on the quality of the feedwater and the frequency with which flushing is accomplished. Thus, preferably flushing with feedwater is performed at least once in every 24-hour period. Time of flushing should be performed at off-peak hours such as 2 a.m. which also has the advantage of high water line pressure increasing the effectiveness of backwash. Further, several consecutive flushes/backwashes may be employed, depending on the quality of the water.

Another important feature of de-concentrating vessel 2 is the duration of time required to perform the flushing with feedwater and backflushing with permeate water. Thus, it is preferred that this action be accomplished in less than 3 minutes and typically less than 1.5 minutes to avoid interruption of water supply to the building.

It will be appreciated that vessel 2 can be drained with feedwater flow turned off and without use of a backflush of permeate water, depending on the amount of solids lodged on the membranes. Draining without backflush can improve flux up to 50%, typically 10 to 35%. Alternatively, vessel 2 can be drained with feedwater flow turned off while using backpulse or backflush from diaphragm tank 20, to remove solids from the membranes. An air valve may be provided at 15 to add air when concentrate is removed or to remove trapped air from tank 2 when feedwater is added.

In the invention, a backwash method, which provides a minimum volume of water to displace the water present in module 2 partially or fully, is the preferred method for maintenance cleaning of the membrane. Under normal operation, the drain valve is closed and water is filtered on demand. As noted, some of the filtered water is accumulated in the diaphragm tank. The drain valve may be opened at a frequency of every three hours to once every week, with the preferred frequency being once per day. This causes the feedwater to flow (see FIG. 1) from the outside top of module 2 to the bottom center and drain through to drain line 8, flushing out the solids and impurities accumulated during filtration. Also, it causes pressure in the module to drop, resulting in backflow of water from the diaphragm tank, through the lumen of the fiber and back through the fiber wall. This detaches the colloidal solids and other impurities deposited on the fiber wall during filtration. The impurities thus removed are drained from filtration tank 2 because the drain valve is opened at the same time as backwash occurs. After a preset time, the drain valve is closed and filtration is resumed. The backwash tank is filled again at the start of the filtration cycle and is ready for operation. The user can set the time. The frequency of flush can be set on a timer to suit requirements.

The size of backwash tank 20 should be such that at least one-third of module 2 volume is supplied as backwash. The cleaning method can range from about one-third of a module displacement of backwash for water with low fouling characteristics, to more than 5 module displacements for highly fouling water supplied at a low pressure. For example, in untreated surface water with high level of organic impurities and low feed pressure, frequent backwash or multiple backwashes may be required with large volume displacement of backwash to maintain acceptable production. In the present invention, the system of backwash and flushing can be operated with one valve as noted earlier, which is valve 24 (FIG. 1) or "drain valve" as noted in FIG. 7, thereby providing a greatly simplified system for household operation.

In accordance with the invention, a multiple module assembly may be used for large installations such as multi-unit dwelling, commercial, industrial and institutional use. In such cases, a simple configuration described above with a single backwash tank may be used to permit maintenance cleaning of all modules simultaneously. Alternately, each module assembly may be installed in parallel with timer-based controls to permit backwash and/or flush of one module at a time to ensure continuous water supply to the system.

Figure 5:
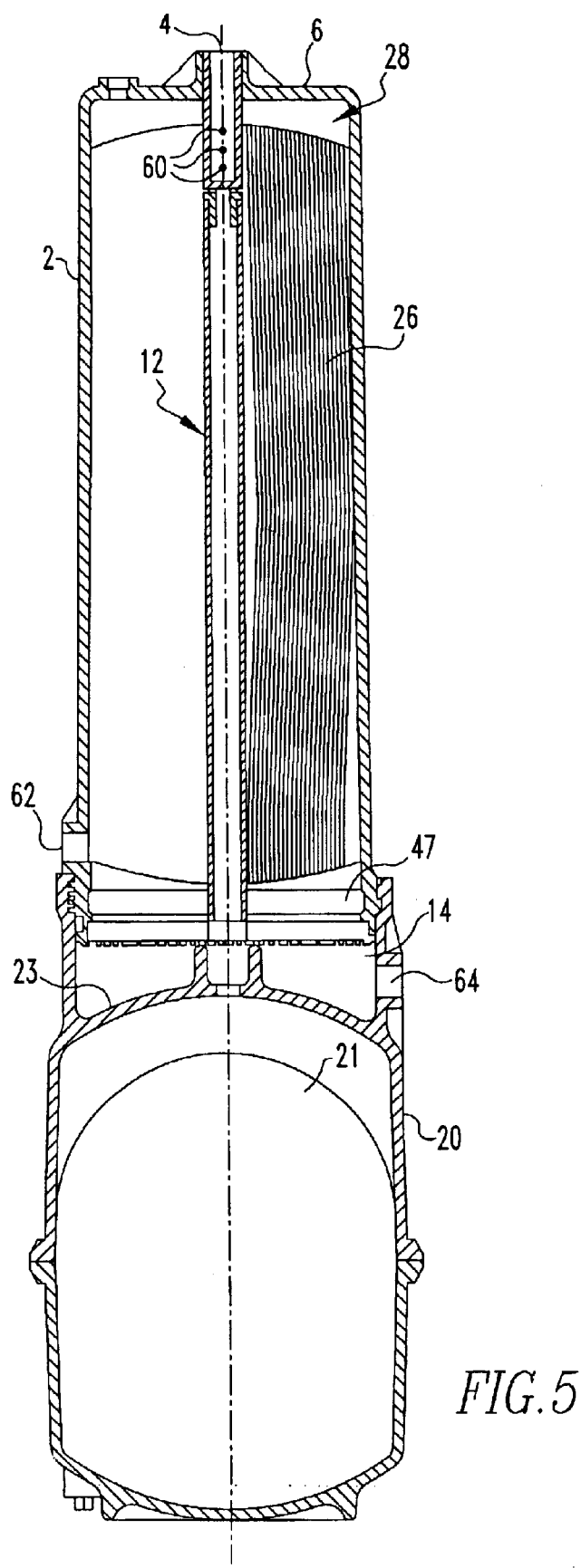
FIG. 5 is a cross-sectional view of a water purification system showing a filtration tank and a backflush tank.

By reference now to FIG. 5, there is shown another embodiment of the invention wherein chamber or filtration tank 2 is shown connected to backflush tank 20 by any suitable means which defines a permeate collection tank or manifold 14. This embodiment essentially eliminates piping shown in FIG. 1 and provides a more compact system. In FIG. 5, feedwater inlet 4 is shown at top 6. Feedwater is introduced through inlet 4 into pipe 12 which is provided with openings 60 to introduce water to the shell side of membranes 26 adjacent or near top 6, as shown in FIG. 5. Tank 2 is provided with a drain opening 62 located on the wall of tank 2. Drain opening 62 can be controlled with a valve or valve means which can include a valve solenoid controlled by a timer, as noted with respect to FIGS. 1 and 7. Membranes 26 are dead-end potted in header 28, as described in FIG. 5. Hollow fiber membranes 26 are potted in header 47 to permit drainage of permeate water from centers or lumens of hollow fiber membranes 26 for collection in manifold 14. The permeate water from manifold 14 is distributed through opening 64 to piping in the building being served. Diaphragm tank 20 is in liquid communication with manifold 14 in order that permeate water therefrom enters diaphragm tank 20 and depresses diaphragm 21 under line pressure to provide for backflushing during draining of tank 2. The liquid communication may be provided by a series of holes or openings (not shown) in member 23 which are free flowing and do not restrict the backflushing operation. Tanks 2 and 20 may be fabricated from molded plastic. Tank 2 has drain 62 molded into the side thereof as shown and tank 20 has opening 64 molded or incorporated therein for distribution of permeate water. It will be understood that the appropriate piping can be attached or threaded into these openings with the required valves.

Figure 6:
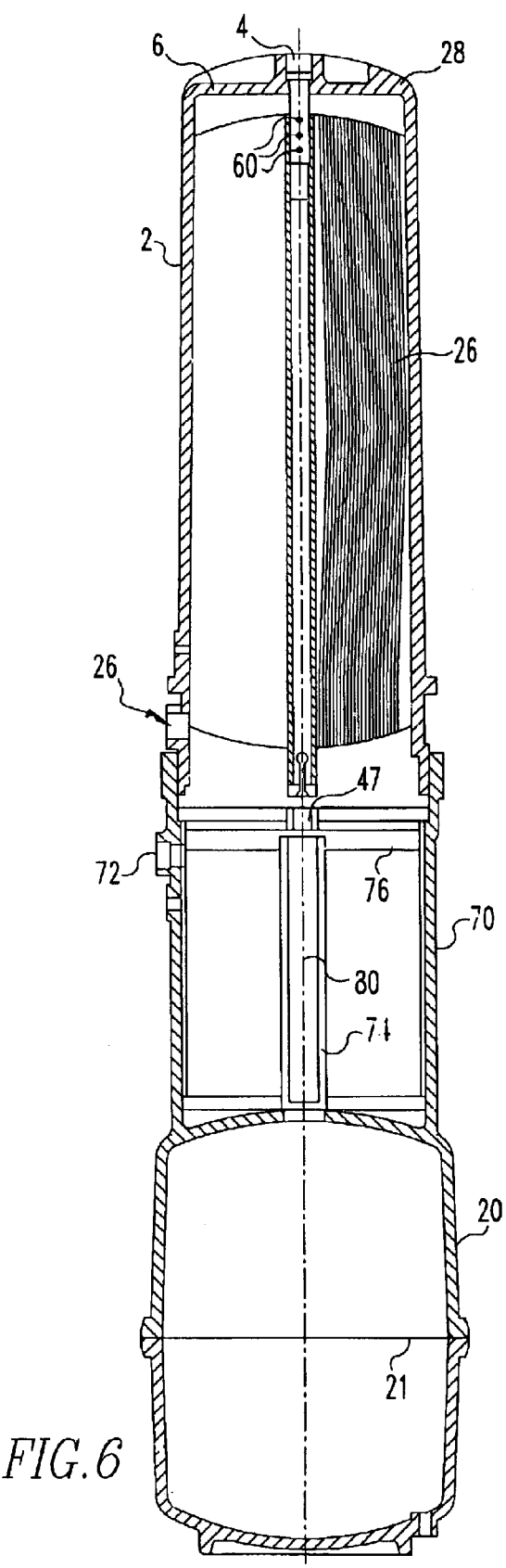
FIG. 6 is a cross-sectional view of a water purification system showing an activated charcoal cartridge and chlorine dispensing device located between a filtration tank and a backflush tank.

The embodiment in FIG. 6 is similar to that in FIG. 5 except the embodiment in FIG. 6 incorporates an activated carbon tank 70 located between filtration tank 2 and backflush tank 20. That is, tank 70 is in liquid communication with both tank 2 and diaphragm tank 20. Activated carbon tank 70 may be part of tank 20. Activated carbon tank 20 has an opening 72 for connecting to piping for dispensing treated permeate water throughout the building being served. Thus, the permeate water is treated with activated carbon or other media to remove tastes or odors as it passes through tank 70. Locating activated carbon tank 70 downstream of filtration tank 2 greatly extends the useful life of the activated carbon because particulate and colloidal organic substances are removed in filtration tank 2. Thus, in operation, water is introduced through inlet 4 and dispersed through openings 60. Permeate water from the lumens of hollow fiber membranes 26 is introduced to tank 70. The permeate water flows through a retainer plate 76 into cartridge core 74 and thus into activated carbon tank 70 and out of carbon tank 70 through port 72. A portion of the permeate water enters tank 20 through pipe or central core 74 to provide water therein under line pressure. Pipe 74 is useful in that it serves to permit backwash water to backflush membranes 26 without being impeded by the activated carbon particles during the backflushing of membranes 26 in tank 2. That is, the backwash liquid can bypass the activated carbon cartridge providing more pressure for backwash.

If desired, a chlorine dispenser 80 may be used during the backflush to disinfect the membrane during the cleaning cycle. Chlorine dispenser 80 which can contain sodium or calcium hypochlorite solution, for example, may be located in pipe 74 and thus a dosage of chlorine in the range of about 0.2 to 5 ppm can be dispensed during the backwash. The chlorine disinfects the hollow fiber membranes, controlling microbial growth on the permeate side and reduces aerobic heterotrophic plate count in the permeate. In another embodiment, dispenser 80 can contain solid calcium hypochlorite. Dispenser 80 which may be a flexible compressible bladder can use a capillary or two-way valve for dispensing the chlorine. This permits discharge of chlorine during the backwash cycle when a large flow of water in the backwash generates higher pressure in pipe 74 than at the fiber lumen entrance compressing the chlorine container and dispensing chlorine into the backwash water. During filling of backwash tank 20, the flow of water is reversed and water is introduced into the dispenser for discharge during the next backwash operation.

For purposes of chemical cleaning, the membrane container 2 can be removed from the assembly for cleaning in order that the membrane recovers its permeability when the pressure drop reaches a predetermined value, e.g., 15 psi. Or, time for chemical cleaning may be determined by the total amount of water processed by the system. Alternately, the module may be cleaned in place by introducing cleaning solution. The chemicals used depend on the nature of the foulants.

Figure 7:
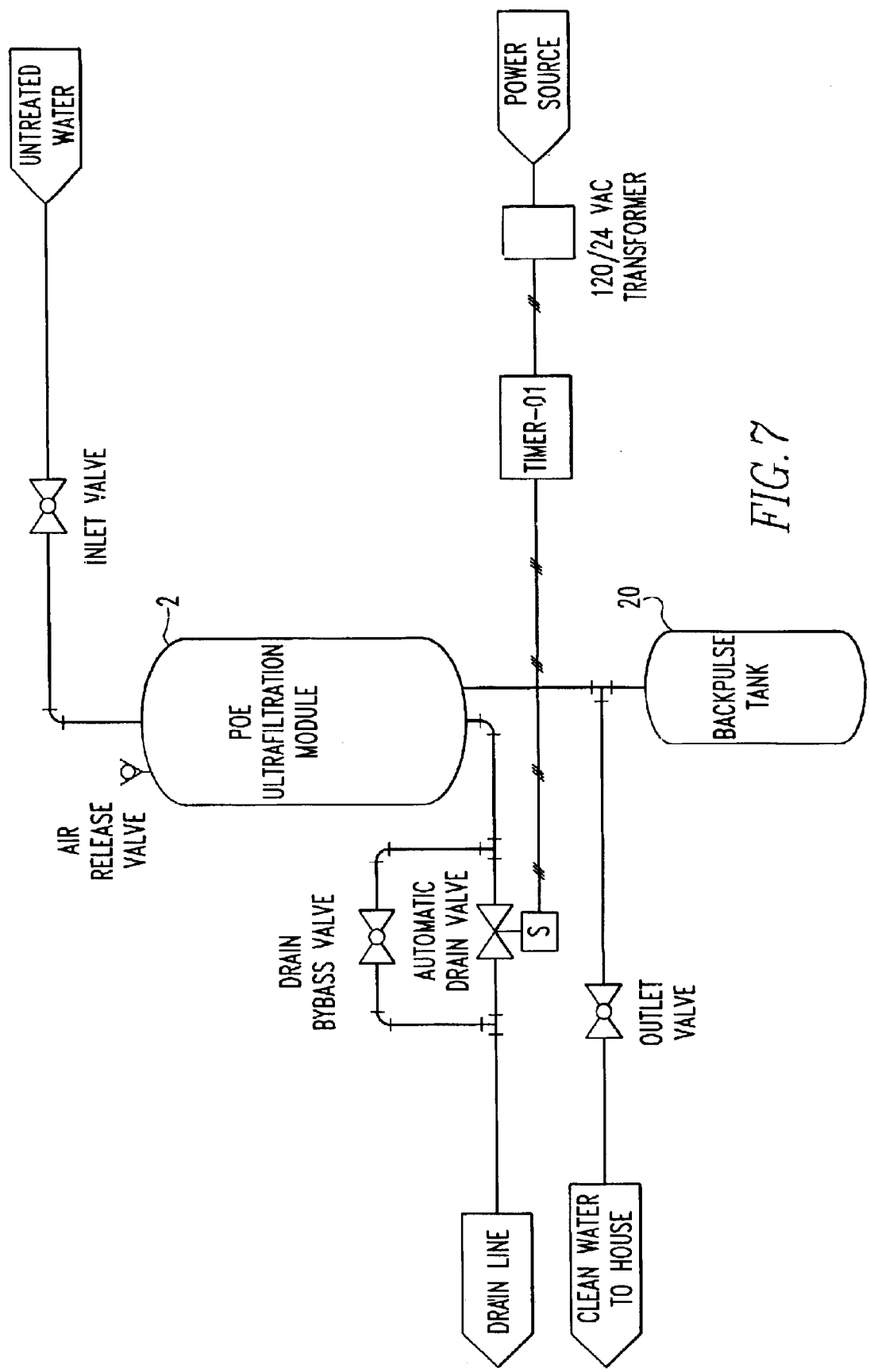
FIG. 7 is a control diagram for periodically draining and cleaning the filtration tank and membranes.

FIG. 7 shows a control process for periodic cleaning of tanks or module 2 and membranes 26. In operation, untreated water is introduced to tank 2 through an inlet valve and permeate water is directed as clean water through an outlet valve to the building being served. During the water purification cycle, backpulse tank 20 is filled under water line pressure and outlet valve is maintained in the open position. The drain valves are maintained in the closed position. For purposes of periodic draining and cleaning tank 2 and membranes 26, the timer sends a signal and opens the automatic drain valve. This permits drainage of concentrate from tank 2 while the outside or shell side of the hollow fiber membranes is continuously flushed with inlet or untreated water. Concurrently therewith, backpulse container 20 flows permeate water into the lumens of the hollow fiber membranes dislodging colloidal matter and particles from the surface of the membranes. The dislodged colloidal matter and particles are flushed from container 2 using the untreated water. After flushing, the timer closes the automatic drain valve, water purification resumes and backpulse tank 20 is recharged. Many variations of draining and cleaning may be employed. For example, tank 2 may be drained without flushing with inlet water but using backwash by closing inlet and outlet valves and opening the drain valve as shown in FIG. 7 to drain both concentrate and backflush water from module or chamber 2. This method provides improved cleaning of the membrane and is useful in high turbidity water for prolonged membrane life. All such combinations are contemplated within the purview of the invention as if specifically set forth.

While the systems shown in FIGS. 1, 5 and 6 are illustrated showing filtration tank or chamber 2 on top and diaphragm tank 20 on the bottom, it will be appreciated that diaphragm tank 20 can be located on top and filtration tank 2 located on the bottom. Or, diaphragm tank 20 may be located to the side of filtration tank 2. Further, while feedwater inlet is shown at the top of filtration tank 2, it may be positioned on the side in an alternate embodiments and such locations are intended to be encompassed within the invention.

In addition, while activated carbon tank 70 is shown located between tank 2 and tank 20 (FIG. 6, it will be appreciated that activated carbon tank 70 may be located on top or side of tank 2 with plumbing to direct permeate water through activated water tank 70. Having tank 70 located on the side or top has the advantage that the activated carbon cartridge utilized in tank 70 is conveniently changed. Further, it is desirable to use other purification techniques, e.g., ion exchange resin or the like, which facilitate changing of the cartridge or system.

While the invention has been shown embodying a single purification module, it will be appreciated that several modules may be used for larger facilities such as hospitals or apartment buildings, and modules can be connected in series. This permits one module to be shut down for regeneration of the membrane, for example, without interfering with water flow to the building being served. Such regeneration may include draining the module to empty without flushing with feedwater or backflushing with permeate water and such is included within the purview of the invention for either single modules or several modules.

The membrane may be backwashed 1 to 6 times every 24 hours with permeate water using 0.2 to 2 micro or ultrafiltration chamber volumes while draining the filtration chamber.

The following examples are further illustrative of the invention and were performed on a laboratory basis in a set-up similar to FIG. 7. In this set-up, one hour of filtering in vessel 2 approximated one day of operation in a typical household in North America. A once-per-hour flush mode was used to clean the filter every hour. This sequence was used to correlate with one-per-day flush for the standard household. The flushing of the membrane is designed to carry the concentrated water containing rejected material to the drain. For purposes of testing in the laboratory, a Point of Entry (POE) Ultrafiltration (UF) filter with 200 square feet of area manufactured by Zenon Environmental, Inc., Oakville, Ontario, Canada, was used. A normally closed solenoid drain valve is used on the untreated side of the filter and a normally open solenoid outlet valve is used downstream for treated water downstream of the filter. A timer was used to control the flushing sequence.

Test #1

In the first test, the outlet valve or clean water valve was open and the drain valve closed. No backpulse was used. Every hour the clean water valve was closed and the drain valve was opened for a period which permitted four module volumes to be displaced to the drain to remove concentrate or debris from the filter. After 120 hours of operation with a flush every hour, the trans-membrane pressure (TMP) of the UF filter had reached about 12 psi which had increased from a starting TMP of 4.5 psi. This was generally considered not to be satisfactory for extended use.

Test #2

The equipment used for this test was the same as in Test #1 (see FIG. 7) except that a diaphragm or backpulse tank was used. The diaphragm tank which received filter water at line pressure supplied one-half filter module of backflush water through the membrane pores. The filter system and cleaning procedure was similar to Test #1 except that the diaphragm tank supplied backwash water during the flushing operation. That is, for purposes of flushing or cleaning the UF filter, the clean water outlet valve was closed which would simulate a household non-use period. Then, the diaphragm tank received water as the system pressure approaches water line pressure. When water line pressure was reached, the drain valve for the module was opened to flush the concentrate from the module. When the drain valve was opened, this dropped the pressure of the water on the untreated water side of the filter membrane. Then, the high pressure in the diaphragm tank forced filtered water back through the membrane expelling any particles lodged in the filter pores during the filtration cycle. At the same time, water to be filtered flowed across the membranes flushing dislodged particles and concentrate to the drain. The cycle was repeated in Test #2 each hour for 400 hours. The TMP was measured and found to be 10 psi which was an increase of 4 psi from a starting point of 6 psi. Thus, it will be seen that backflushing markedly improved performance of the membrane filter.

Test #3

This test was set up and run as in Test #2 except that a 500 square foot UF filter membrane was used and the backwash was set to supply one-half module of backwash water. After 370 hours of operation, the trans-membrane pressure (TMP) reached a value of 10 psi. A TMP of 15 psi after 365 hours of cycling operation is considered acceptable.

Test #4

This test was set up and performed as in Test #3 except that a double back-to-back backflush was employed each hour. Further, the diaphragm tank used provided about one-third the volume of the filter module at each backflush. Thus, after the first module flushing and backwashing, the diaphragm tank was permitted to fill and immediately the filter module was flushed and backwashed again. It was found that after 370 hours of cyclic operation with double flush and backflush each hour, the TMP had only reached 8 psi which is a marked improvement on filter performance.

Test #5

This test was set up and performed as in Test #3 except that the inlet valve (see FIG. 7) was closed before each backwashing of the UF module. An air release valve was used to provide air during draining and to exhaust air during refilling of the UF module. In this test, because the inlet valve was closed, the UF membrane was backwashed and the module drained until it was empty. After draining, the inlet valve was opened and the module and diaphragm tank refilled. Using this procedure each cycle resulted in a TMP which did not substantially increase during extended operation. This procedure prolongs filter operational life and is useful for high turbidity waters which foul membranes quickly. Also, it would have application in commercial applications for extended filter life.

Test #6

Figure 8:
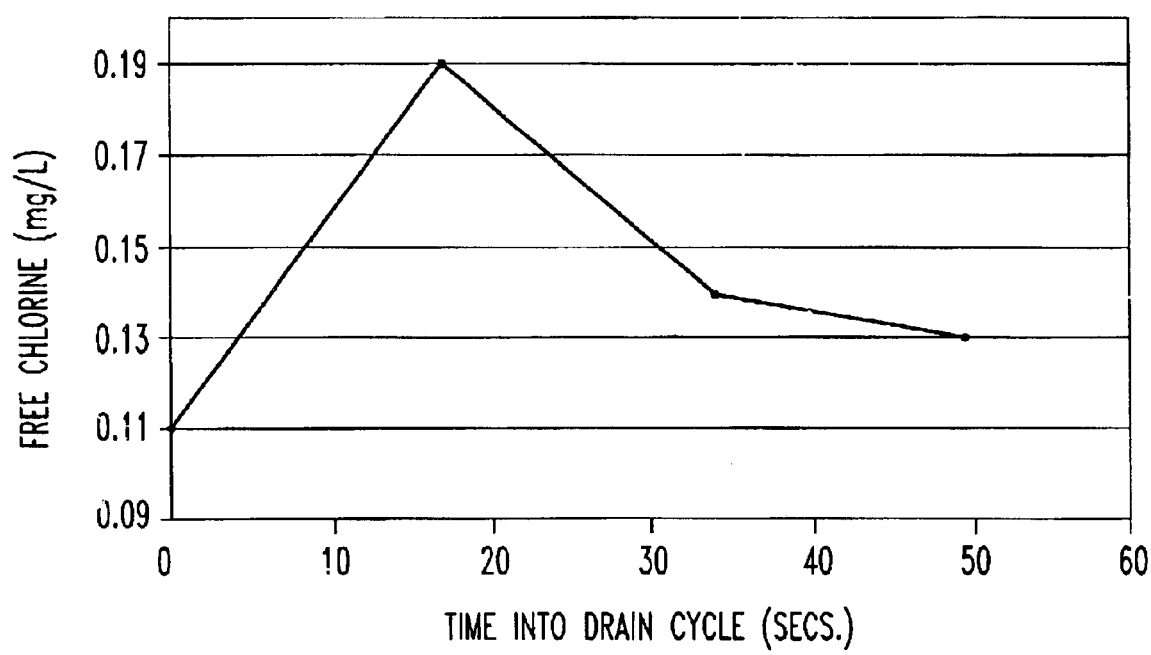
FIG. 8 is a graph showing the amount of chlorine versus time to drain water from the module.

A passive injection device consisting of a PVC pressure vessel containing a soft polyethylene impermeable, collapsible bag or bladder containing about 200 ml of a 12% W/V NaOCl solution was installed in a 9 USGPM ZENON ultrafiltration membrane system treating Burlington tap water. External tubing connections were made to the device from exterior side of the collapsible bag to the permeate side of the pressure tank and from the inside of the collapsible bag to the permeate face of the fiber membrane module. The latter contained a capillary tube which controls the flow from the collapsible bag to the module fiber face. Measurements indicated that a pressure differential of about 5 psi for four seconds existed between the two connections during each module flush. The capillary was calibrated to deliver 0.18 ml 12% NaOCl per second at 5 psi. Calculations show that a total of 0.75 ml of 12% NaOCl would be delivered at the permeate side of the membrane during the backwash/flush cycle. The backwash/flush cycle was about 50 second duration and over that time discharges 12 USG to drain. To verify the effect of the injection device, drain samples were taken at intervals and analyzed for free chlorine. The data in FIG. 8 shows the effect of the chlorine injection by the passive device on the free chlorine content of the drain water during a backwash/flush cycle. In samples of drain water taken during the 48th cycle, the free chlorine level increased from 0.11 to 0.19 mg/l at 17 seconds into the cycle tapering to 0.13 mg/l at the end of the cycle, confirming that the device injected sodium hypochlorite near the start of the flush/backwash cycle.

While the invention has been described in terms of preferred embodiments, the claims appended hereto are intended to encompass other embodiments which fall within the spirit of the invention.

What is claimed is:

1. A system for purifying feedwater to remove impurities including solids therefrom, the system for use with in-line water pressure to permeate water through membranes and to remove solids collected thereon, the system comprising:
   (a) a closed chamber having a first end and a second end and a first region and a second region, a feedwater entrance for connecting to a feedwater line, a permeate water exit and a concentrate water exit;
   (b) membranes provided in said chamber and adapted for permeating water therethrough to purify water to provide permeate water and to reject solids under in-line water pressure to provide concentrate water in said chamber;
   (c) a permeate collector for collecting said permeate water through said permeate water exit for distribution;
   (d) a pressure tank in fluid connection with said permeate water collector, said pressure tank adapted for storing permeate water at in-line water pressure, said pressure tank adapted for backflushing said membranes with permeate water; and
   (e) means for periodically draining concentrate water from said chamber through said concentrate water exit and lowering the pressure in said chamber below in-line water pressure, and means for backwashing said membranes with permeate water from said pressure tank to dislodge solids from said membranes for removal with said concentrate water during said draining, said means for backwashing activated by said means for draining and lowering the pressure in said chamber.

2. The system in accordance with claim 1 wherein said membranes are hollow fiber membranes disposed between said first and said second end, said membranes in fluid connection with said permeate water exit and having dead-ends potted in a first header disposed in said first region of said chamber and second ends potted in a second header disposed in said second region of said chamber, said second ends of said membranes having lumens adapted to empty permeate water into said permeate collector.

3. The system in accordance with claim 1 wherein said membranes are ultrafiltration membranes.

4. The system in accordance with claim 1 wherein said membranes are microfiltration membranes.

5. The system in accordance with claim 1 including providing means for flushing said chamber with feedwater during activation of means for draining and backflushing.

6. The system in accordance with claim 1 wherein the pressure tank is disposed below said chamber.

7. The system in accordance with claim 1 wherein said bundles of membranes are arranged substantially vertically in said chamber and said concentrate water exit is located substantially below said membranes to facilitate draining.

8. A system for purifying feedwater to remove impurities including solids therefrom, the system adapted to use in-line water pressure to permeate water through membranes and to remove solids collected thereon, the system comprising:
   (a) a closed chamber having a first end and a second end, a feedwater entrance in said chamber for connecting to a feedwater line and, a permeate water exit and a concentrate water exit;
   (b) bundles of hollow fiber membranes selected from ultrafiltration and microfiltration membranes provided in said chamber and disposed between said first end and said second end, said hollow fiber membranes in fluid connection with said permeate water exit and adapted for permeating water from said chamber therethrough into lumens thereof to purify water and reject solids under in-line water pressure to provide concentrate water in said chamber;
   (c) a permeate water collector adapted for removal of permeate water from said lumens for re-distribution;
   (d) a pressure tank in liquid communication with said permeate water collector for storing permeate water in said pressure tank at in-line water pressure, said pressure tank adapted for backwashing said membranes with permeate water; and
   (e) valve means for periodically draining concentrate water from said chamber through said concentrate water exit and for lowering the pressure in said chamber below the in-line water pressure, said valve means draining and lowering the pressure in said chamber, by said means capable of
      (i) activating backwashing of said membranes with permeate water from said pressure tank to dislodge solids from said membranes for removal with said concentrate water during said draining, and
      (ii) activating flushing of said chamber with feedwater during said periodically draining concentrate water and backwashing.

9. An assembly for purifying feedwater to remove impurities including solids therefrom, the assembly for use with in-line water pressure to permeate water through membranes and to remove solids collected thereon, the assembly comprised of:
   (a) a closed chamber having a first end and a second end, a feedwater entrance located in said first end for connecting to a feedwater line, a permeate water exit and a concentrate water exit;
   (b) bundles of hollow fiber membranes provided in said chamber and disposed between said first end and said second end, said hollow fiber membranes in fluid connection with said permeate water exit and adapted for permeating water from said chamber therethrough into lumens thereof to purify water and reject solids under in-line water pressure to provide concentrate water in said chamber;
   (c) a permeate collector adapted for collecting water from said lumens for distribution;
   (d) a pressure tank coupled to said permeate water collector, said pressure tank adapted for storing permeate water at in-line water pressure, said pressure tank arranged for backwashing said membranes with permeate water; and
   (e) valve means arranged for periodically draining concentrate water from said chamber through said concentrate water exit and lowering the water pressure in said chamber below in-line water pressure, said valve means by draining and lowering pressure in said chamber, activating backwashing of said membranes with permeate water from said diaphragm tank to dislodge solids from said membranes for removal with said concentrate water during said draining.

10. An assembly for purifying feedwater to remove impurities including solids therefrom, the assembly for use with in-line water pressure to permeate water through membranes and to remove solids collected thereon, the assembly comprised of:
   (a) a closed chamber having a first end and a second end, a feedwater entrance located in said first end for connecting to a feedwater line, a permeate water exit and a concentrate water exit;
   (b) bundles of hollow fiber membranes provided in said chamber and disposed between said first end and said second end, said hollow fiber membranes in fluid connection with said permeate water exit and adapted for permeating water from said chamber therethrough into lumens thereof to purify water and reject solids under in-line water pressure to provide concentrate water in said chamber;
   (c) a permeate collector adapted for collecting water from said lumens for distribution;
   (d) a pressure tank in fluid connection with said permeate water collector, said pressure tank adapted for storing permeate water at in-line water pressure, said pressure tank adapted for backflushing said membranes with permeate water; and
   (e) a controller arranged for periodically opening and closing a concentrate water exit valve to drain concentrate water from said chamber through said concentrate water exit and to lower the pressure in said chamber below in-line water pressure, and said pressure tank activated for backwashing said membranes with permeate water by lowering the pressure in said chamber.

* * * * *